Aug. 13, 1957  J. H. STRAW  2,802,276
COMPACT HEAD FOR PNEUMATIC BORE GAUGE
Filed March 10, 1954
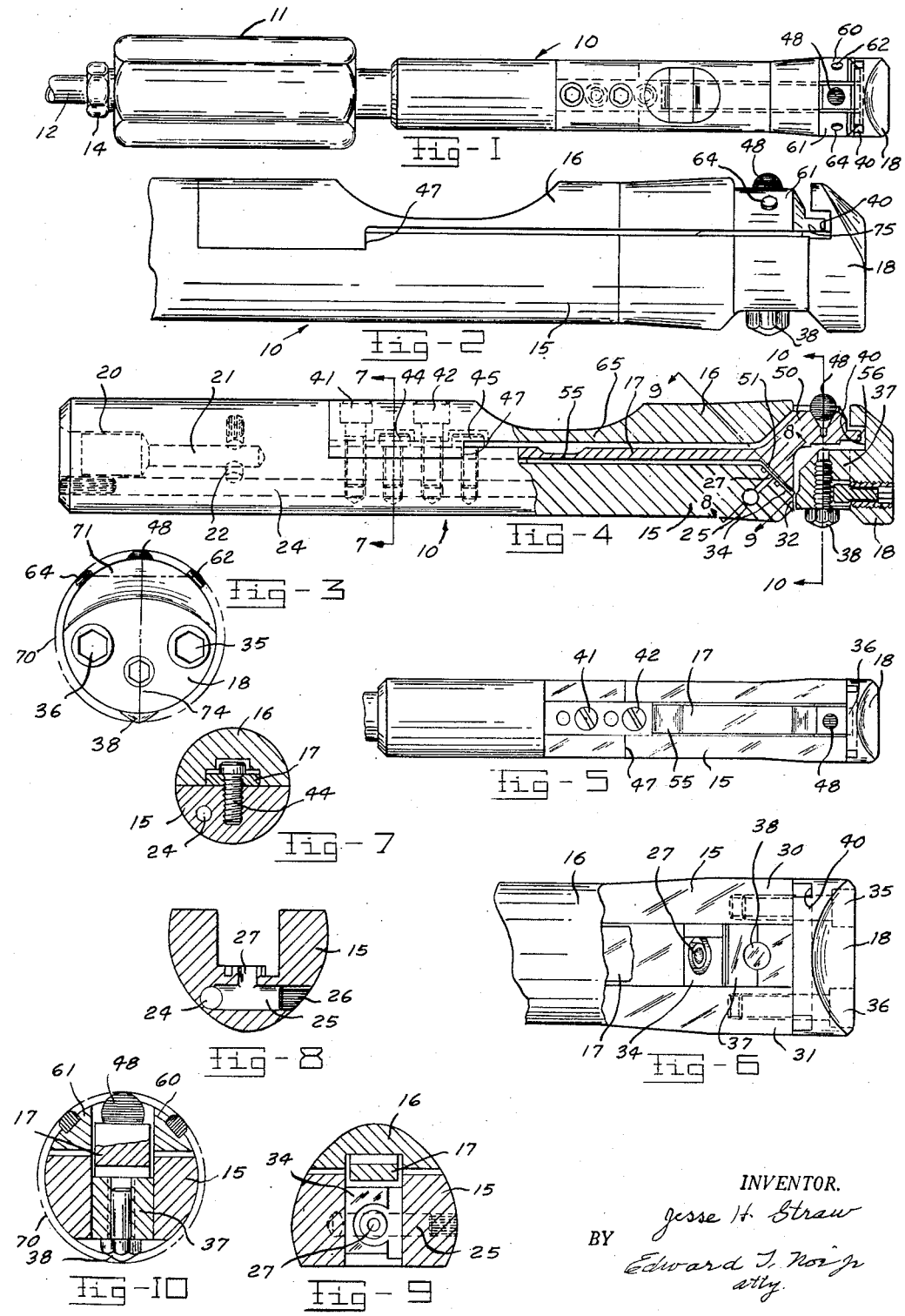
INVENTOR.
Jesse H. Straw
BY Edward T. Noig Jr.
atty.

United States Patent Office 2,802,276
Patented Aug. 13, 1957

2,802,276

COMPACT HEAD FOR PNEUMATIC BORE GAUGE

Jesse H. Straw, Brookville, Ohio, assignor to The Sheffield Corporation, Dayton, Ohio, a corporation of Ohio Application March 10, 1954, Serial No. 415,229

7 Claims. (Cl. 33—178)

This invention relates to a gauge for measuring the diameter of a cylindrical hole.

It is an object of this invention to provide a gauge head for measuring hole diameters which comprises a few simple and ruggedly conformed components thus adapting the gauge head for repeated accurate gauging through a long service life.

It is a further object to provide such a gauge head which is compact in form and which has an external configuration adapting it for easy entry into and removal from a hole in gauging and wherein all critical gauge head components are closely shielded from damage in a gauging operation.

It is a further object to provide a gauge head of the character referred to wherein a leakage orifice and an orifice controlling surface are inclined to the direction of relative movement therebetween in a gauging operation, whereby an amplification function is achieved, both the orifice outlet and controlling surface being situated in an inward position in the gauge head and closely protected on all sides from impact, abrasion, dirt or work chips and other factors tending to destroy gauging accuracy.

Other objects and advantages of the invention will be apparent from the following description, the appended claims, and the accompanying drawings, in which, Figure 1 is a view of an exemplary gauge head embodying the features of the present invention, shown with a handle attachment, Figure 2 illustrates the gauge head in a view rotated 90 degrees about the axis of the gauge head from that of Figure 1, Figure 3 is a view illustrating the right hand end of the gauge head of Figures 1 and 2, Figure 4 is a view similar to that of Figure 2 disclosing the outer end of the gauge head in central longitudinal section, Figure 5 is a view similar to that of Figure 1 but with the uppermost member which carries the locating contacts removed, Figure 6 is a view of the outer end of the gauge head with the locating contact carrying member and the arm which resiliently carries a gauging contact both broken away, exposing the interior of the gauge head and the fluid leakage orifice and, Figures 7 to 10 are sectional views taken on correspondingly numbered lines of Figure 4.

The gauge head of this invention is one wherein the leakage through an orifice outlet is controlled in accordance with the diameter of a hole the orifice being connected to a source of fluid under pressure and a gauge which responds to the controlled fluid leakage and indicates the diameter of the hole being gauged.

The gauge head 10 as seen in Figure 1 is connected to a handle 11. A conduit 12 which communicates with a source of fluid under regulated pressure and a suitably calibrated gauge is fixed to a nipple 14. Fluid supplied through conduit 12 flows through handle 11 and then through the gauge head 10 to the fluid leakage orifice disposed centrally within the gauge head adjacent its outer end.

The gauge head 10 is simply conformed of a few rugged components. Major components comprise a body member 15, a resilient locating member 16, a gauging arm 17, and an outer gauge head end piece or cap 18.

The body member 15 is longitudinally extended and is circular along its inner portion. For the major portion of its length it has a substantially semicircular cross-section. Handle 11 is threaded into the inner end of body member 15. Fluid under pressure supplied centrally through the handlle 11 flows through a passage 21, a substantially radial passage 22, and then through a longitudinal passage 24 which extends along the length of the body member 15 but is offset from the center thereof as indicated in Figures 7 and 8. As its outer end passage 24 communicates with a transverse passage 25 which is plugged at 26 (see Figure 8). The orifice outlet is indicated at 27 in communication with the transverse passage 25. The plane of the orifice outlet 27 is inclined relative to the longitudinal axis of the gauge head 10. The outer end of body member 15 is forked or slotted and the body member 15 terminates at this end in two extensions 30 and 31. At the bottom of the slot formed between extensions 30 and 31 of the body member 15 there are two flat surfaces disposed at angles to one another. The outermost of these surfaces which is substantially radial to the gauge head 10 is indicated at 32 in Figure 4. The second surface is indicated at 34. This surface 34 is inclined relative to the axis of the gauge head and the orifice outlet 27 lies in the plane thereof.

A gauge head cap or end piece 18 is fixed to the extensions 30 and 31 of the body member 15 by means of screws 35 and 36 having their heads seated in counterbores in the cap 18 and threaded at their inner ends into the extensions 30 and 31 respectively. This cap 18 has an inward projection 37 which extends inward closely between the extensions 30 and 31 of the body member 15 and adjacent to the radial surface 32 at the bottom of the slot therebetween. This projection 37 carries a gauging contact 38 adjustably threaded and clamped therein. The gauging contact 38 is provided for engagement with one side of a hole surface and positions the body member 15 and the orifice outlet 27 with respect to one side of the hole wall. The upper outer surface of the cap 18 as illustrated is conically chamfered for easy entry into a hole being gauged. The cap 18 has a transverse groove across its inner face as indicated at 40, provided for purposes later described.

The gauging arm 17 and the locating member 16 are both fixed at their inner ends to the body member 15 and extended therealong. A pair of screws 41 and 42 pass through the locating member 16, the gauging arm 17 and into the body member 15. A second pair of screws 44 and 45, which have their heads in relieved inner portions of the locating member 16, passes through the gauging arm 17 and are threaded into the body member 15. The situation for the screw 44 is illustrated in Fig. 7. By this attachment means the inner ends of both these comonents are rigidly secured to the body member and the locating member 16 can be removed from the gauging head without releasing the gauging arm 17. Beginning at the stepped portion 47 the inner substantially flat surface of body member 15 has a longitudinal groove along which the gauging arm 17 extends.

Adjacent its outer end the gauging arm 17 carries a second gauging contact 48 for engagement with a diametrically opposite point on the hole wall from that engaged by gauging contact 38. This second gauging contact 48 is carried on extension 50 of the gauging arm 17, which extension is disposed substantially radially in the gauging head 10. The outer end of the gauging arm 17 also provides an orifice controlling surface 51 which is situated in parallel relationship to the plane of the surface 34 in the body member 15 and to the orifice outlet 27. The gauging arm 17 has a reduced transverse section as indicated at 55 about which the gauging contact 48 swings in accordance with hole dimensions. A tang-like extension 56 projects from the outer end of the gauging arm 17 into the slot 40 which passes transversely across the gauge head cap 18. By means of the cooperation between the tang-like projection 56 with the slot 40 and the upper beveled surface of the cap 18 it is assured that the contact 48 will pass smoothly into the hole being gauged and into engagement with the hole wall without the danger of gauge head end portions squarely abutting the end face of the part as would be possible if these components were exposed.

The locating member 16 is also forked at its outer end and has a transverse slot across its outer end which is substantially radial to the axis of the gauge head 10. The extension 50 of the gauging arm 17 extends outward along this slot and between the forked extensions 60 and 61 at the outer end of locating member 16. The locating member extensions 60 and 61 carry locating contacts 62 and 64, respectively, for engagement with the hole surface at spaced chordal points. The locating member 16 has a reduced transverse resilient section indicated at 65 about which the locating contacts 62 and 64 are urged resiliently into locating engagement with the hole wall.

Thus it will be seen that when gauging if gauging contactors 38 and 48 engage a hole wall at the opposite extremities of a diameter they will relatively position the orifice outlet 27 and the orifice controlling surface 51 in accordance with the hole diameter, giving a resultant fluid flow which is dependent upon the hole dimension and which can be indicated and measured by a suitable gauge. Were the plane of the orifice outlet 27 and the controlling surface 51 perpendicular to the line of relative movement between contacts 48 and 38 and to a hole diameter the orifice closing would be linear in response to relative movement between the gauging contacts. However, as seen most clearly in Figure 4, the opposing planes of these gauging components are obliquely inclined relative to the axis of the gauge head and to the hole diameter along which the contactor 48 moves. With this arrangement an amplifying function is achieved in the control of the fluid flow.

It will be noted in Figure 2 that the outer end 75 of the extension 61 is chamfered and extends into the transverse slot 40 in the cap 18. Through the cooperation of the projection within the slot 40 and the chamfered surfaces provided on both projections 60 and 61 of body member 16, radial surfaces at the outer end of the gauge head are avoided and easy entry of the gauge head into the hole to be measured is further assured.

The phantom outline of a hole wall is indicated at 70 in Figs. 3 and 10. It will be seen that the engagement of contacts 62 and 64 will determine a hole chord line as indicated at 71. With the gauging contacts 38 and 48 disposed along a line 74 which is perpendicular to the chord line defined by contacts 62 and 64 at its midpoint the relative gauging movements between these gauging contacts 38 and 48 will be along a hole diameter. Thus by inserting the gauge head 10 into a hole and rocking it about the chordal line 71 defined by locating contacts 62 and 64 until a minimum reading is achieved accurate diametrical measurements can be made.

It will thus be seen that due to the extreme simplicity of the few major gauge head components and the compact arrangement the gauge head of this invention will be extremely rugged and useful for an indefinite period of accurate gauging. All critical gauge head components such as the orifice controlling surface and the orifice outlet itself are closely surrounded by other components of the gauge head and are therefore protected. Due to the unique configuration of the outer end of the gauge head and the cooperation between the outer extremities of the various gauge head components the gauge head can be easily slid into a hole, particularly if it is inserted in an inclined position with the bevel surfaces on the gauge head engaging the hole first. When so inserted, the movable gauging contact will smoothly engage the wall of the hole and the gauge head will readily slide into the hole as the axis of the gauge head is moved more closely into alignment with the axis of the hole engaged.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gauge head for measuring the diameter of a cylindrical hole in a part comprising: an elongated body member having a fluid supply passage therein adapted for connection at one end to a source of fluid under pressure and a gauge, the supply passage terminating in an orifice outlet in the surface of the body member at the other end of said passage, the plane of the orifice outlet being obliquely inclined relative to the axis of the body member, a pair of locating contacts, resilient means carrying said locating contacts from said body member and urging the locating contacts into engagement with the hole wall at spaced chordal points, a first gauging contact, means fixing said first gauging contact to said body member at the opposite side of the body member from the said locating contacts and equi-distant therefrom, a second gauging contact, a resilient gauging arm carrying said second gauging contact from said body member between and adjacent said locating contacts for engagement with and positioning by the hole wall, the first and second gauging contacts being disposed in opposing relationship along a line perpendicular to the chord defined by the locating contacts at its midpoint and lying along a hole diameter, an orifice controlling surface on said gauging arm disposed in parallel relationship to the orifice outlet for control thereof in accordance with the relative positions of the first and second gauging contacts and the hole diameter.

2. A gauge head for measuring the diameter of a cylindrical hole in a part comprising: an elongated body member having a fluid supply passage therein adapted for connection at one end to a source of fluid under pressure and a gauge, the supply passage terminating in an orifice outlet at the other end of said passage in the surface of said body member, the plane of the orifice outlet being obliquely inclined relative to the axis of the body member, a pair of locating contacts; a locating member extending along said body member, fixed to said body member at the inner end of the locating member, carrying the locating contacts adjacent its outer end for engagement with the hole wall at spaced chordal points and having a reduced resilient transverse section between its ends; a first gauging contact fixed to said body member at the opposite side thereof from said locating contacts and equidistant therefrom, a second gauging contact; a gauging arm extending along said body member, fixed to said body member at the inner end of the arm, having a reduced resilient transverse section between its ends and carrying the second gauging contact at its outer end disposed between the locating contacts and adjacent thereto for engagement with the hole wall and gauging movements along a hole diameter; the first and second gauging contacts being disposed in opposing relationship along a line perpendicular to the chord line defined by the locating contacts at its midpoint, said gauging arm having an orifice controlling surface thereon disposed in parallel relationship to said orifice outlet for control of the fluid leakage therethrough in accordance with the relative positions of the first and second gauging contacts and the hole diameter.

3. A gauge head for measuring the diameter of a cylindrical hole in a part comprising: an elongated body member having a fluid supply passage therein adapted for connection at one end to a source of fluid under pressure and a gauge, a locating member fixed to said body member at the inner end of the locating member and extending along the body member, said locating member having a reduced resilient transverse section between its ends, the gauge head being of substantially circular cross section as defined by the outer peripheries of the body and locating member, the locating member having a substantially radial slot at its outer end, a pair of locating contacts, one fixed to the outer surface of said locating member at either side of said slot, an extended resilient gauging arm fixed to said body member at the inner end of the gauging arm and extending along and between said body and locating members, said gauging arm having an extended projection situated in the radial slot of the locating member, a gauging contact on the outer surface of said extension situated adjacent to and between said locating contacts, a second gauging contact fixed to said body member at the opposite side of said body member from said locating contacts and equidistant therefrom, the other end of said fluid supply passage terminating in an orifice outlet, the plane of the orifice outlet being obliquely inclined relative to the axis of the body member and situated at the opposite side of said gauging arm from said locating member, and an orifice controlling surface on said gauging arm disposed in parallel relationship to the orifice outlet for control thereof in accordance with the relative positions of the gauging contacts and the hole diameter.

4. A gauge head for measuring the diameter of a cylindrical hole in a part comprising: an elongated body member, an elongated locating member fixed at its inner end to said body member and extending therealong, the gauge head having a substantially circular cross section defined by the outer peripheries of the body member and the locating member, the end faces of said body member and said locating member having substantially aligned slots thereacross, locating contacts fixed to the outer surface of said locating member at each side of the slot thereacross, a gauging arm situated between said members within said gauging head, fixed to said body member at the inner end of the arm, an extension on said arm extending along the slot in said locating member, a first gauging contact on the outer surface of said extension positioned between and adjacent to said locating contacts, said arm and locating member each having a reduced resilient transverse section between their ends, a second gauging contact, an end piece of cylindrical outline fixed to said body member at its outer end having a projection extending into the end slot in the body member and carrying said second gauging contact at the opposite side of said gauge head from said locating contacts and equidistant therefrom, said elongated body member having a fluid supply passage therein adapted for connection at one end to a source of fluid under pressure and a gauge, the fluid supply passage terminating in an orifice outlet in the body member at the other end of said passage, the plane of the orifice outlet being obliquely inclined relative to the axis of the body member, an orifice controlling surface on said arm disposed in parallel relationship to the orifice outlet for control thereof in accordance with the relative positions of the gauging contacts and the hole diameter.

5. A gauge head for measuring the diameter of a cylindrical hole in a part comprising: an elongated body member, said body member having a slot across one end thereof, the bottom of the slot being defined by a radially outer surface perpendicular to the axis of the body member and an inner surface obliquely inclined relative thereto, a locating member fixed at its inner end to said body member and extending therealong and having a reduced resilient transverse section between its ends, said locating member having a slot at the outer end thereof substantially aligned with the slot in the body member, a gauging arm extending along and between said locating member and said body member fixed at its inner end to said body member and having a reduced transverse resilient section between its ends, locating contacts provided for engagement with the hole wall at spaced chordal points fixed at the outer end of said locating member at each side of the slot thereacross, a gauging contact carried at the outer end of said gauging arm for movement along the axis of the locating member slot and disposed adjacent to and between the locating contacts, said elongated body member having a fluid supply passage therein adapted for connection to a source of fluid under pressure and a gauge, said fluid supply passage terminating in an orifice outlet in said obliquely inclined surface of the body member slot and facing said gauging arm, an end piece fixed to said body member, said end piece having a projection extending into the body member slot adjacent the first bottom surface thereof and carrying a second gauging contact disposed at the opposite side of said gauging head from said locating contacts and equidistant therefrom, an orifice controlling surface on said gauging arm disposed in parallel relationship to the second slot surface of the body member and to the orifice outlet for control of flow therethrough in accordance with the relative positions of the first and second gauging contacts and the hole diameter.

6. The gauge head of claim 5 wherein the end piece has a transverse slot across the inner face thereof, the locating member and gaging arm each having forward extensions extending into such slot with clearance and the forward surfaces of the end piece, the locating arm and the gauging arm having substantially parallel beveled surfaces facing outwardly and forwardly.

7. A gauge head for measuring the diameter of a cylindrical hole in a part comprising: an elongated body member having a fluid supply passage therein adapted for connection at one end to a source of fluid under pressure and a gauge, the supply passage terminating in an orifice outlet in the surface of the body member at the other end of said passage, the plane of the orifice outlet being obliquely inclined relative to the axis of the body member, a locating member mounted on said body member and yieldably carrying a pair of locating contacts for engagement with the hole wall at spaced chordal points, a first gauging contact, means fixing said first gauging contact to said body member at the opposite side of the body member from said locating contacts and equidistant therefrom, a second gauging contact, an elongated gauging arm extending between said body and locating members and substantially housed thereby, said gauging arm resiliently carrying said second gauging contact between and adjacent said locating contacts for engagement with and positioning by the hole wall, the first and second gauging contacts being disposed in opposing relationship along a line perpendicular to the chord defined by the locating contacts at its midpoint and lying along a hole diameter, an orifice controlling surface on said gauging arm disposed in substantially parallel relationship to the orifice outlet for control thereof in accordance with the relative positions of the first and second gauging contacts and the hole diameter.

References Cited in the file of this patent

UNITED STATES PATENTS

| | | |
|---|---|---|
| 2,590,170 | Gates | Mar. 25, 1952 |
| 2,623,294 | Fox | Dec. 30, 1952 |